(12) United States Patent
White

(10) Patent No.: US 8,857,112 B2
(45) Date of Patent: Oct. 14, 2014

(54) RAPID ASSEMBLY LIGHTWEIGHT MODULAR STRUCTURE

(71) Applicant: Wayne Neville White, Albuquerque, NM (US)

(72) Inventor: Wayne Neville White, Albuquerque, NM (US)

(*) Notice: Subject to any disclaimer, the term of this patent is extended or adjusted under 35 U.S.C. 154(b) by 0 days.

(21) Appl. No.: 13/832,086

(22) Filed: Mar. 15, 2013

(65) Prior Publication Data

US 2014/0259995 A1    Sep. 18, 2014

(51) Int. Cl.
*E04D 13/18*    (2014.01)
*E04H 14/00*    (2006.01)

(52) U.S. Cl.
CPC .................................. *E04H 14/00* (2013.01)
USPC .............................................. 52/173.1; 52/63

(58) Field of Classification Search
CPC ...... B64G 1/48; B64G 1/12; B64G 2001/224; B64G 1/46; B64G 1/52; B64G 1/60
USPC .................................................. 52/63, 173.1
See application file for complete search history.

(56) References Cited

U.S. PATENT DOCUMENTS

| | | | |
|---|---|---|---|
| 4,649,676 A | 3/1987 | Davey | |
| 4,887,397 A | 12/1989 | Peterson | |
| 5,086,999 A | 2/1992 | Mullen | |
| 5,333,421 A | 8/1994 | McKenna | |
| 5,581,960 A | 12/1996 | Lewis | |
| 6,131,343 A | 10/2000 | Jackson, Jr. | |
| 6,231,010 B1 | 5/2001 | Schneider et al. | |
| 6,439,508 B1 | 8/2002 | Taylor | |
| 6,547,189 B1 | 4/2003 | Raboin | |
| 6,594,958 B2 | 7/2003 | Melson et al. | |
| 6,899,301 B2 | 5/2005 | Bigelow | |
| 7,469,864 B2 * | 12/2008 | Bigelow | 244/158.1 |
| 2007/0200033 A1 * | 8/2007 | Bigelow | 244/158.3 |
| 2009/0302166 A1 * | 12/2009 | Meyers | 244/158.9 |
| 2012/0225237 A1 | 9/2012 | Brockwell | |
| 2012/0318926 A1 * | 12/2012 | Ingham et al. | 244/159.4 |

OTHER PUBLICATIONS

Tate, Karl. The International Space Station: Inside and Out. Published on Space.com on Nov. 20, 2012.*
NASA: Orbiting Agriculture. Published Oct. 20, 2005 on http://www.nasa.goy/missions/science/f_lada.html.*
NASA Technical Paper 309, Radiation Protection for Human Missions to the Moon and Mars, at p. 2 (1991).
NASA Selects Early Stage Innovation Proposals From 10 Universities, NASA Press Release 12-373, Oct. 24, 2012.
http://www.nasa.gov/directorates/spacetech/strg/2012_stro_esi_ignatiev.html.
http://www.nasa.gov/pdf/709702main_ignatiev_update.pdf.
http://ntrs.nasa.gov/archive/nasa/casi.ntrs.nasa.gov/20110000798_2010047135.pdf.

* cited by examiner

*Primary Examiner* — Mark Wendell

(57) ABSTRACT

Disclosed is a lightweight modular structure that can be transported to the surface of a celestial body in one rocket payload, and assembled rapidly by two robots. The structure is airtight, thermally insulated, resistant to micro-meteoroid penetration, provides radiation shielding, includes an airlock, and is capable of being pressurized and equipped with life support systems. When assembled on celestial bodies with gravity up to 40% of Earth's gravity, the structure can be buried under two meters of extraterrestrial material to provide additional thermal insulation, radiation protection, and protection against micrometeoroid penetration. The structure can be assembled in different configurations, and may include windows, modular walkways to connect a plurality of structures, and hangar-style doors to accommodate passage of large items. The structure can also be configured for use on Earth in areas of chemical, biological, radiological, or nuclear (CBRN) contamination, and in areas subject to extreme temperatures.

16 Claims, 5 Drawing Sheets

RAPID ASSEMBLY LIGHTWEIGHT MODULAR STRUCTURE

STATEMENT REGARDING FEDERALLY SPONSORED R&D

No government rights: the owner/inventor received no government funding or in-kind government support during the process of conceiving this invention, and no government contract, grant, SBIR, STTR, cost shared subcontract, CRADA, WFO, collaborative or cooperative agreement is related to this concept.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

The present invention relates generally to modular outer space structures, and more specifically to a lightweight modular structure that is capable of rapid assembly, airtight pressurization, and utilization for habitation on the surface of celestial bodies such as the Moon and Mars. This invention is capable of either robotic or human assembly.

2. Description of the Prior Art

Historically assembly of structures in outer space has been a long, tedious, labor-intensive and expensive process, as demonstrated the International Space Station assembly process. Due to the many hours of arduous and complex activity necessary to assemble space structures in a vacuum, astronauts have faced a significant risk of accidental injury or death during assembly activities, particularly if their protective space suit is damaged.

Inexpensive, lightweight and portable structures' most significant period of development began in 1941 when the U.S. Government believed war was imminent and the U.S. military saw a need for lightweight portable structures. The government asked the George A. Fuller Company to design and produce a but to US specification. These huts became known as "Quonset huts", and approximately 165,000 of the various versions of the design were built and sold to the U.S. government during World War II. (http://www.seabeesmuseum.com/Quonset_Huts.html)

In the years since World War II many designs for rapid assembly, lightweight, portable structures have been patented. Some examples are U.S Pat. No. 6,594,958 to Melson et al., U.S. Pat. No. 6,131,343 to Jackson, Jr., U.S Pat. No. 5,581,960 to Lewis, U.S Pat. No. 5,333,421 to McKenna, U.S Pat. No. 4,887,397 to Peterson, and U.S Pat. No. 4,469,676 to Davey. These structures were not designed for rocket launching and use in outer space. These structures were not designed to fit in the payload faring of a launch vehicle when unassembled. These structures are not airtight, cannot be pressurized, and cannot be equipped with life support systems for use in outer space. These structures are not thermally insulated to maintain an interior temperature range in which humans can survive when temperatures exterior to the structure are in the extreme range encountered in outer space. These structures do not provide occupants with any significant protection against solar/solar flare proton radiation and galactic cosmic radiation.

U.S. Pat. No. 5,086,999 to Mullen is an example of a rigid modular structure designed for use in outer space. This invention is composed primarily of metal, so its weight makes it expensive to launch, and it is not designed for use on the surface of celestial bodies. This invention is designed to be transported in the cargo bay of a United States space shuttle. The United States no longer operates the space shuttle, so this invention is obsolete.

In recent years, U.S. company Bigelow Aerospace, LLC has demonstrated inflatable space structures with soft-shell exteriors made of generally pliable and flexible material. These structures do not require human assembly; they launch deflated and inflate after they reach orbit. Two separately-launched Bigelow inflatable modules are currently in low Earth orbit that did not require human assembly.

As currently conceived, inflatable structures cannot accommodate entry of large articles into the structure without significant modification and human assembly activity, they do not provide any significant protection against solar/solar flare proton radiation or galactic cosmic radiation (gamma rays), and they are not designed to bear external weight, as for example a structure might experience if it were buried under 1-2 meters of extraterrestrial material. Modular inflatable and expandable space structures are typified, for example, by U.S. Pat. No. 6,899,301 B2 to Bigelow, U.S. Pat. No. 6,439,508 to Taylor, U.S. Pat. No. 6,231,010 to Schneider, et al, U.S. Pat. No. 6,547,189 to Raboin, et al, and U.S. Pat. No. 5,086,999 to Mullen.

U.S. Pat. No. 7,469,864 to Bigelow describes a method of assembling a habitable structure comprised of a plurality of inflatable structures, connecting nodes, busses, and landing pads that are assembled in orbit, and subsequently landed on the surface of an extraterrestrial mass. This structure can be assembled robotically. This design risks structural deformation and degradation of structural integrity during the assembled structure's descent to the surface. The structure provides no significant radiation shielding, and is not designed for the external load that would result if the structure were buried under two meters of extraterrestrial material.

U.S. Pat. No. 6,899,301 to Bigelow describes a method for installing windows on an inflatable structure. This method requires activity outside of the structure to locate a bladder and template on the outer shell, to penetrate and cut the fabric of the outer shell following the template, and to install the window. This patent does not state that the method can be accomplished robotically, so human activity must be necessary. It follows that installation of hangar doors would require human assembly efforts outside the structure as well. Thus, this design poses a risk of injury or death of astronauts when astronauts work in the vacuum outside the facility to perform assembly work. This structural design can also take a significant amount of time to completely assemble if the structure were to include hangar doors and/or one or more windows.

U.S. Pat. No. 8,621,822 to Brockwell describes structural members formed from strips of material with notches on the strips, wound with woven tensile material in the notches. When at least one pair of structural members are joined together, the woven patterns of tensile material distribute stress throughout the structure. Total catastrophic failures in composite materials are substantially avoided, and the strength-to-weight ratio of structures can be increased through use of this technology.

SUMMARY OF THE INVENTION

The present invention relates to a lightweight modular structure that can be assembled rapidly and utilized for habitation and other purposes on the surface of celestial bodies. The structure is airtight, thermally insulated, resists micrometeoroid penetration, includes an airlock, provides radiation shielding, and is capable of being pressurized with air and equipped with systems for the support of human life. The structure can be assembled in different configurations, and may include one or more windows, and hangar-style doors at one or both ends to accommodate passage of large items. A plurality of these modular structures can be connected to each other utilizing modular connecting elements.

A primary object of the present invention is to provide a modular structure that one or more robots can rapidly assemble on a celestial body in advance of a human mission, such that the structure is capable of immediate inhabitation by humans when they arrive on the celestial body.

Another object of the present invention is to provide a structure that is lighter in weight than other hard-shell habitation structures designed for use on celestial bodies.

Another object of the present invention is to provide a structure that is modular, and designed to fit in the payload faring of a launch vehicle, such that the un-assembled structure can be delivered from Earth to a celestial body in one payload.

Another object of the present invention is to provide a structure that is thermally insulated, such that the interior of the structure remains within a temperature range of 15.55° C./60° F. to 26.66° C./80° F., while the exterior of the structure is subjected to the extreme temperatures that are experienced on celestial bodies.

Another object of the present invention is to provide a structure that protects occupants against external solar/solar-flare proton radiation and galactic cosmic radiation, for a period of one month, such that the radiation dose-equivalents for each occupant do not exceed NASA's Space Flight Radiation Exposure Dose Limits for U.S. astronauts.

Another object of the present invention is to provide a structure that can bear the exterior load of being buried under two meters of extraterrestrial material on celestial bodies with gravity up to 40% of Earth's gravity.

Another object of the present invention is to provide a structure which is airtight at four to twenty psia.

Another object of the present invention is to provide a structure that is significantly lower in cost than other hard-shell habitation structures designed for use on celestial bodies.

Another object of the present invention is to provide a structure that can accommodate up to 6 human inhabitants for up to one year.

Another object of the present invention is to provide a structure that can be connected with other structures to add additional habitable space as needed.

DETAILED DESCRIPTION OF THE INVENTION

1. Definitions

NASA Space Flight Radiation Exposure Dose Limits, as set forth in NASA-STD-3001, Volume 1, Appendix F. 8, Table 4(2007):

| Dose limits for short-term or career non-cancer effects (in mGy-Eq. or mGy) Note RBE's for specific risks are distinct as described below. | | | |
|---|---|---|---|
| Organ | 30 Day Limit | 1 Year Limit | Career |
| Lens* | 1000 mGy-Eq | 2000 mGy-Eq | 4000 mGy-Eq |
| Skin | 1500 | 3000 | 4000 |
| BFO | 250 | 500 | Not applicable |
| Heart** | 250 | 500 | 1000 |
| CNS*** | 500 | 1000 | 1500 |
| CNS*** (Z > 10) | — | 100 mGy | 250 mGy |

*Lens limits are intended to prevent early (<5 yr.) severe cataracts (e.g. from a solar particle event). An additional cataract risk exists at lower doses from cosmic rays for sub-clinical cataracts, which may progress to severe types after long latency (>5 yr.) and are not preventable by existing mitigation measures., however, they are deemed an acceptable risk to the program.
**Heart doses calculated as average over heart muscle and adjacent arteries.
***CNS limits should be calculated at the hippocampus.

A "celestial body" is a natural body outside of the Earth's atmosphere, including without limitation planets, moons, and asteroids." http://www.universetoday.com/48671/celestial-body/ (accessed Jun. 14, 2014).

"psia" is an acronym for "pounds per square inch absolute". Pounds per square inch absolute is the pressure resulting from a force of one pound-force applied to an area of one square inch relative to a vacuum rather than ambient atmospheric pressure. http://en.wikipedia.org/wiki/Pounds_per_square_inch (accessed Jun. 15, 2014).

2. Best Mode of the Invention

Figure 1:
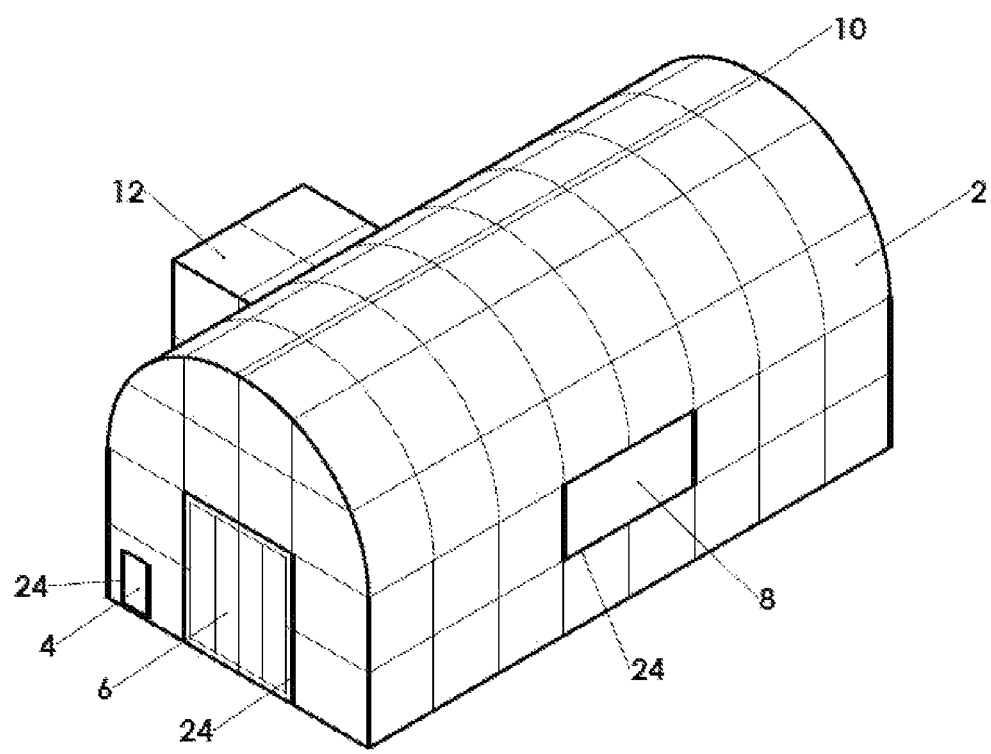
FIG. 1 is an isometric view of the structure exterior without the external thermal insulation layer installed, such that the seams between modular panels are visible.

FIG. 1 shows an exterior isometric view of the best mode contemplated by the inventor of the rapid assembly lightweight modular structure 10 utilized as a habitation facility according to the concepts of the present invention.

3. How to Make the Invention

As shown in FIG. 1 the structure is comprised of modular composite panels 2, an airlock unit 4, one set of composite hangar doors comprised of four door panels 6, and one window 8. An optional connecting walkway structure 12 permits a plurality of these structures to be connected together to provide additional habitable space.

Figure 2:
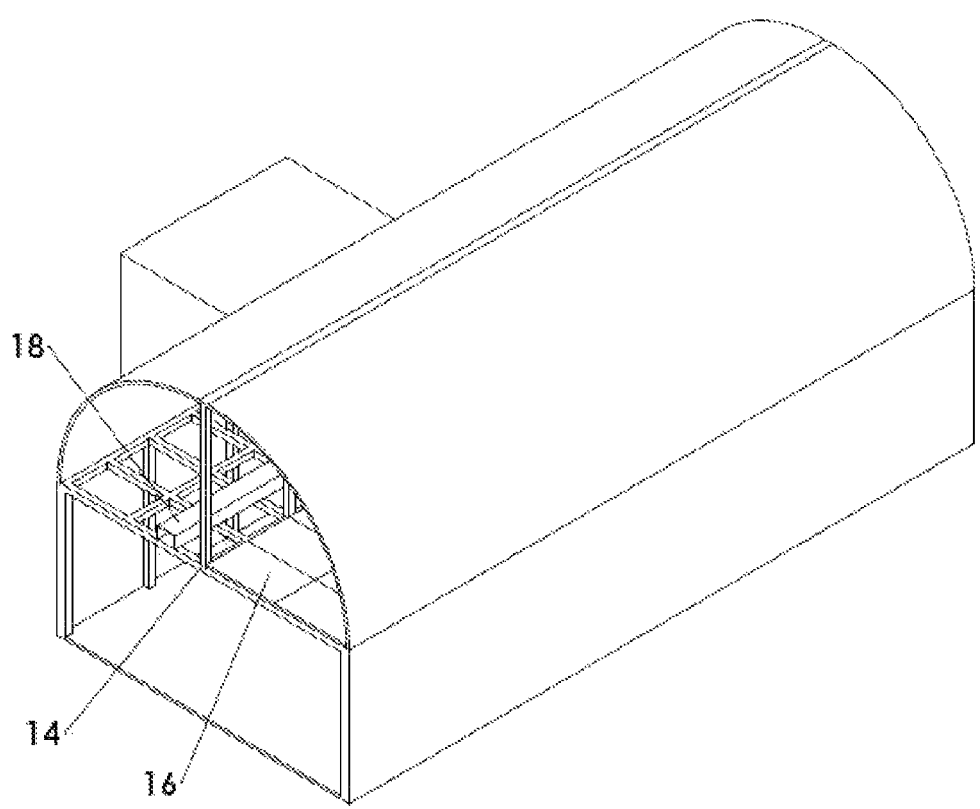
FIG. 2 is a top section floor plan of the structure.

As shown in FIG. 2 interior rafters 14 and composite panels adhesively attached to the top of the rafters 16 are capable of supporting air-handling ducts 18, and stored items. The rafters are capable of embedding electrical connectors, electrical wiring, electric outlets, and communications cabling and connectors.

Figure 3:
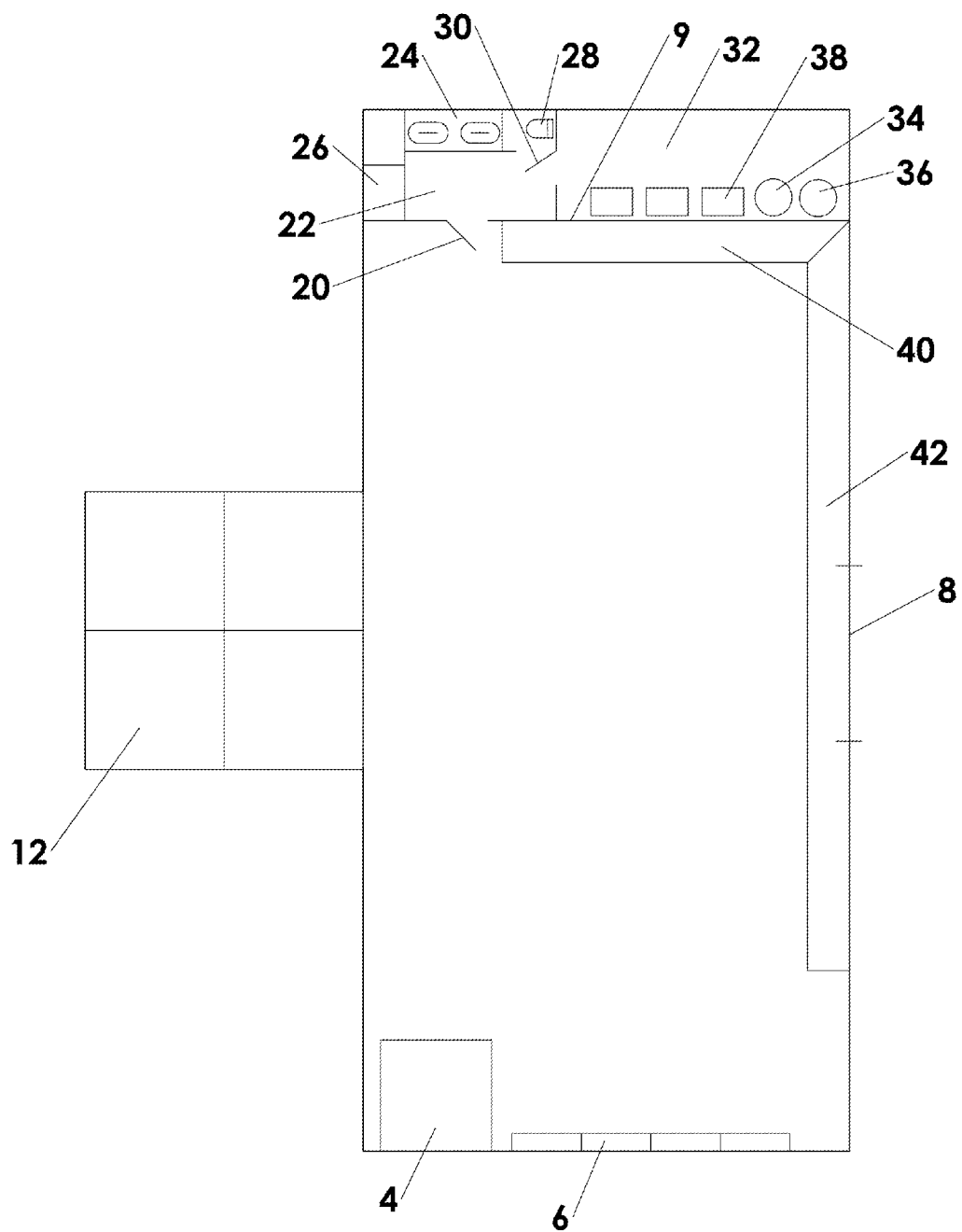
FIG. 3 is a front section view of the structure.

As shown in FIG. 3 there is an interior wall 9 at the rear of the structure which runs paralled to the rear wall, and contains a conventional terrestrial interior door 20 in the left half of the wall. The interior door 20 leads to a lavatory area 22. The lavatory is capable of including a cabinet with two sinks and faucets 24, two shower enclosures 26, and a toilet 28.

An interior door at the right of the lavatory 30 leads to a utility room 32. The utility room 32 is capable of being equipped with pressurized air tanks 34, a water tank 36, and life support systems 38 that are capable of supporting habitation of the structure by six human beings.

Countertops 40 are mounted in the structure interior along the side of the interior wall 9 opposite to the utility room 32, and countertops 42 are mounted along the right wall of the structure. If these countertops 40 and 42 do not have sinks, cabinets or other equipment installed on them, they can be folded down parallel to the walls when not in use.

Figure 4:
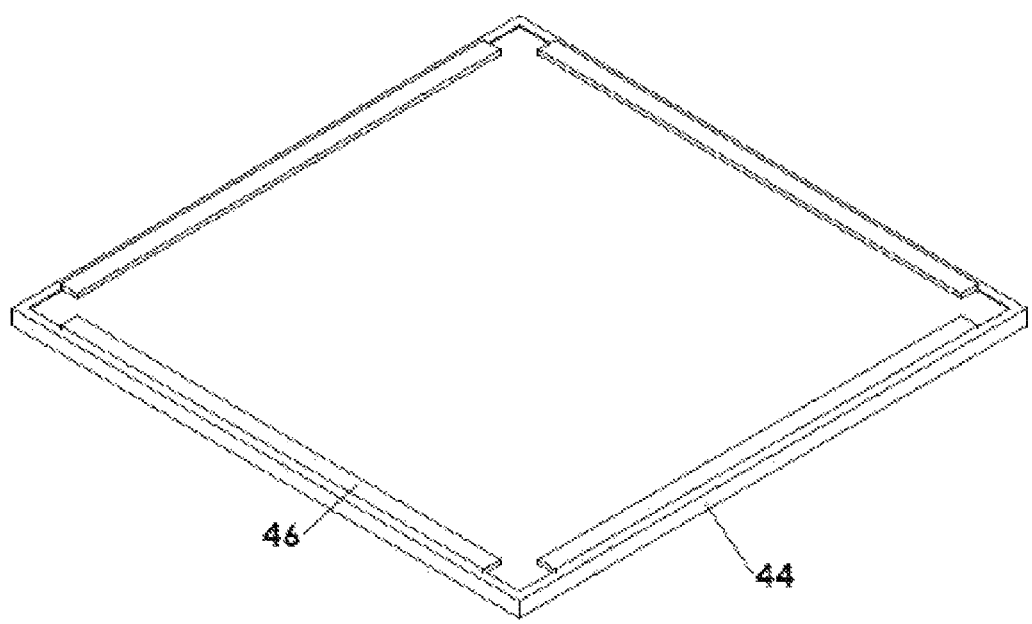
FIG. 4. is an interior view of a modular panel without the insulation and polymeric material layers attached.

As shown in FIG. 4 sealing means comprised of polymeric material 44 is adhesively installed over the mating surfaces of the exterior composite panels 2. As shown in FIG. 1, the polymeric material 44 also adhesively seals the mating surfaces between composite panels 2 and: the airlock 4, the hangar doors 6, and the window 8. These polymeric adhesive seals over the mating surfaces of the exterior composite panels 2, airlock 4, hangar doors 6 and window 8 collectively form an airtight seal about the enclosed interior volume.

The exterior composite panels 2 are mechanically joined across mating seams by attachment mechanisms 46 which are simply shown as rectangles to identify the location where they are mounted on the panel. These attachment mechanisms will be selected from the group consisting of bonded flanges and screws; threaded inserts and screws; composite cross members and screws; hinges; and clamps.

Figure 5:
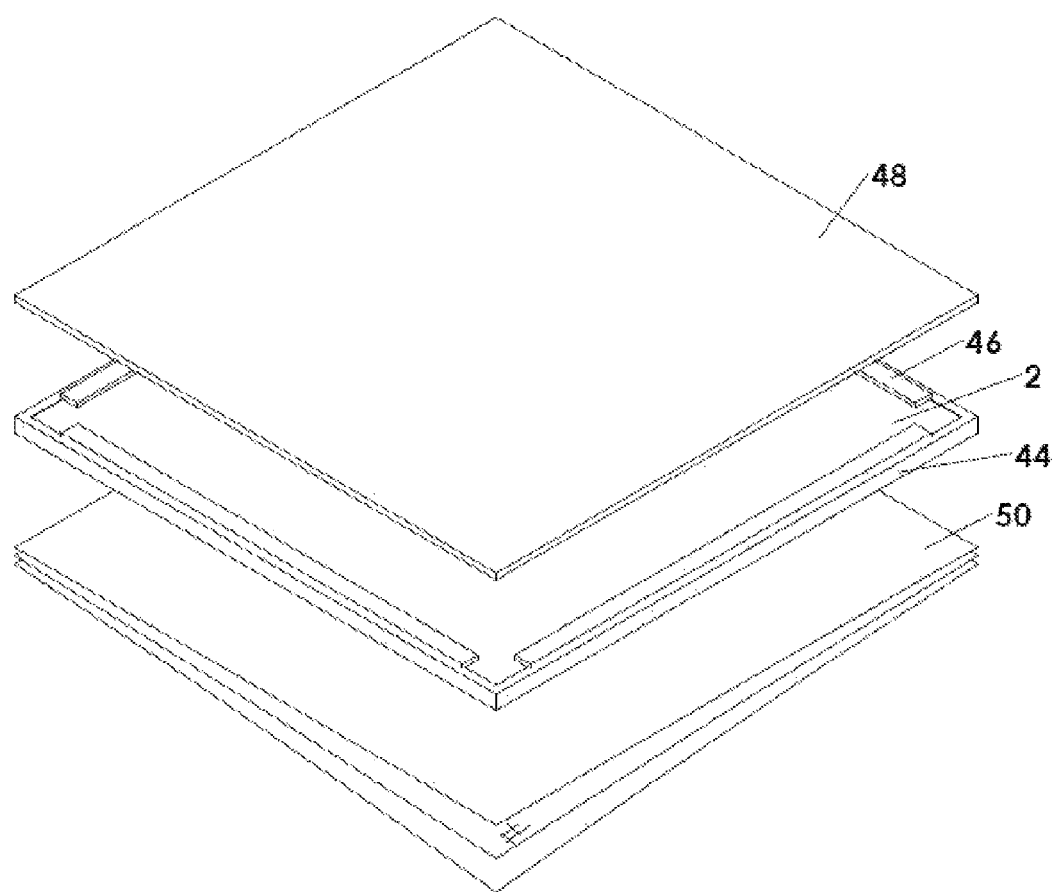
FIG. 5 is a side view of a modular panel with the polymeric material layer and insulation layers shown.

As shown on FIG. 5, after the structure is assembled a layer of polymeric material 48, for example methyl methacrylate/ethyl acrylate copolymer, is adhesively attached to the inner surface of the modular exterior panels 2 and other exterior parts to provide a secondary seal about the enclosed interior volume, thus ensuring that the structure remains airtight.

When the thermal insulation 50 is affixed to the exterior of the assembled structure 10, the interior temperature will remain within the range of 15.55° C./60° F. to 26.66° C./80° F. The insulation layer will be multilayer insulation or some other type of insulation.

The assembled structure 10 with thermal insulation 50 installed provides radiation shielding sufficient to ensure that occupants can inhabit the structure for one month without exceeding NASA's recommended Space Flight Radiation Exposure Dose Limits for U.S. astronauts, as set forth in NASA-STD-3001, Volume 1, Appendix F. 8 (2007).

The assembled structure 10 with thermal insulation 50 installed is capable of supporting two meters of extraterrestrial material covering the roof, sides, and rear wall. This configuration provides radiation shielding sufficient to ensure that occupants can inhabit the structure for up to one year without exceeding NASA's recommended Space Flight Radiation Exposure Dose Limits, as set forth in NASA-STD-3001, Volume 1, Appendix F. 8 (2007).

4. How to Use the Invention

The assembled structure can be used as a habitation structure as can be amply seen from the drawings. The structure is primarily comprised of composite material that is lighter in weight than comparable prior designs for Moon and Mars habitats, which are primarily comprised of metal. The structure is modular, and capable of being assembled in many configurations. The structure provides significant solar/solar-flare proton radiation and galactic cosmic radiation protection for human occupants. The structure is thermally insulated to maintain an interior temperature range of 15.55° C./60° F. to 26.66° C./80° F. The structure is airtight, is capable of being pressurized, and is capable of including life support equipment that is capable of supporting the lives of six human inhabitants.

The unassembled modular elements can be delivered to the structure's destination in one rocket-launched payload, and the structure can be assembled by robots prior to the arrival of the first human mission.

The assembled structure is capable of including full-spectrum lighting for the purpose of growing plants.

The assembled structure is capable of including laboratory equipment.

The assembled structure is capable of including maintenance and repair equipment for the purpose of maintaining and repairing rovers, excavation equipment, construction equipment, and mining equipment. Due to the abrasive nature of lunar dust, one can anticipate that equipment operated on the lunar surface will require frequent maintenance and periodic repair in order to remain operational.

The structure can function as a very large airlock on a celestial body when an air compressor is installed, and the structure is equipped with hangar doors 6 at both ends. This configuration would be useful to allow large items to pass from unpressurized vacuum to a pressurized construction or mining area underground.

The structure is capable of being buried under two meters of extraterrestrial material, over the sides and rear wall of structure, and over the roof to a depth of two meters, to increase thermal insulation, radiation protection and micrometeoroid impact protection. The process of burying the structure with extraterrestrial material can be accomplished robotically or by humans.

The structure is capable of use on Earth as a command post, detection and analysis laboratory, and/or shelter in an area subject to chemical, biological, radiological, or nuclear (CBRN) contamination, when the structure is airtight, pressurized, and equipped with detection, analysis, and/or decontamination equipment. Military, first-responder, and disaster relief organizations are example of organizations that might use the structure in areas of CBRN comtamination.

The structure, with its thermal insulation 50 installed, is capable of being used on Earth in areas of extreme temperature, including the artic, Antartica, and desert areas, as a habitation facility, shelter, garage, repair and maintenance facility, storehouse, laboratory, or greenhouse. Oil & gas companies, mining companies, universities, and government agencies are examples of organizations that can take advantage of the structure's light weight, rapid assembly, robotic assembly, versatility of use, and large equipment access to better and more timely support resource exploration, drilling, mining, and scientific activities.

5. Examples of the Invention

Thus it will be appreciated by those skilled in the art that the present invention is not restricted to the particular best mode embodiments described with reference to the drawings, and that variations may be made therein without departing from the scope of the present invention as defined in the appended claims and equivalents thereof.

What is claimed is:

1. A rapid assembly lightweight modular structure that is capable of being launched from Earth to a celestial body, unassembled, and then assembled on the surface of the celestial body, comprising: modular elements that when assembled form a structure that is airtight from four to twenty psia, said modular elements including exterior composite panels that form walls and arched roof of the structure; said modular elements further including an airlock unit located in the left half of the front wall; said modular elements further including one set of hangar doors, which are located in the front wall of the structure, to the right of the airlock; said modular elements further including a window which may be located in either side of the structure; said modular elements further including compressed air tanks located on the interior of the structure; said modular elements further including life support equipment located in the interior of the structure; said modular elements further including an air pump in the interior of the structure capable of maintaining pressurization of the structure from four to twenty psia; said modular elements further including polymeric sealing material, attachment mechanisms, and adhesive capable of maintaining an airtight seal between all exterior modular elements; and said modular elements further including polymeric sealing material adhesively attached over the interior of all external modular elements except the airlock, hangar doors, and window.

2. A rapid assembly lightweight modular structure according to claim 1, wherein said structure includes a modular walkway that is capable of connecting one side of the structure to another structure to provide additional habitable space.

3. A rapid assembly lightweight modular structure according to claim 1, wherein said structure includes thermal insulation that is affixed to the exterior of the structure; and said structure further includes heating and air conditioning equipment in the interior of the structure, such that the interior of the structure remains in the temperature range of 15.55° C./60° F. to 26.66° C./80° F.

4. A rapid assembly lightweight modular structure according to claim 1, wherein said modular structure includes exterior panels that are composed of composite materials that have radiation-shielding properties, whereby humans are capable of inhabiting the structure without exceeding NASA Space Flight Radiation Exposure Dose Limits, as set forth in NASA-STD-3001, Volume 1, Appendix F.8, Table 4 (2007), for a period of one month when the structure includes exterior thermal insulation, and for a period of one year when the structure, including external thermal insulation, is covered with two meters of material on all sides except the front of the structure, and to a depth of two meters over the roof of the structure.

5. A rapid assembly lightweight modular structure according to claim 1, wherein said structure, when assembled on a celestial body with gravity up to 40% of Earth's gravity, is capable of being buried under, and bearing the weight of two meters of extraterrestrial material on all sides except the front of the structure, and over the roof to a depth of two meters, without structural degradation, for the purposes of providing additional thermal insulation, additional radiation protection, and additional protection against micrometeoroid penetration.

6. A rapid assembly lightweight modular structure according to claim 1, wherein said structure includes full-spectrum lighting for the purpose of growing plants.

7. A rapid assembly lightweight modular structure according to claim 1, wherein said structure includes laboratory equipment in the interior of the structure.

8. A rapid assembly lightweight modular structure according to claim 1, wherein said structure includes maintenance and repair equipment for the purpose of maintaining and repairing rovers, materials-processing equipment, excavation equipment, construction equipment, and mining equipment.

9. A rapid assembly lightweight modular structure according to claim 1, wherein the unassembled modular elements of the structure are capable of being launched in one rocket payload.

10. A rapid assembly lightweight modular structure according to claim 1, wherein the structure is capable of being assembled by two robots.

11. A rapid assembly lightweight modular structure capable of functioning as a very large airlock on a celestial body, comprising: modular elements that when assembled form a structure that is airtight from four to twenty psia, said modular elements including exterior composite panels that form the walls and arched roof of the structure; said modular elements further including an airlock unit located in the left half of the front wall of the structure; said modular elements further including a vacuum pump capable of removing all air from the interior of the structure; said modular elements further including an air pump capable of pressurizing the interior of the structure from four to twenty psia; said modular elements further including compressed air tanks; said modular elements further including polymeric sealing material, attachment mechanisms, and adhesive; said modular elements further including thermal insulation; and said modular elements further including two sets of hangar doors, one at each end of the structure, such that large items are capable of passing from unpressurized vacuum, through the front hangar doors into the structure, and then after the front hangar doors are closed, and the structure is sealed and pressurized, are capable of passing through the rear hangar doors into a pressurized construction or mining area underground.

12. A rapid assembly lightweight modular structure that is capable of being assembled on Earth, comprising: modular elements that when assembled form a structure, said modular elements including exterior composite panels that form the walls and arched roof of the structure; said modular elements further including one exterior door, which is located in the left half of the front wall of the structure; said modular elements further including one set of hangar doors, which are located in the front wall of the structure to the right of the exterior door; said modular elements further including a window which may be located in either side of the structure; and said modular elements further including polymeric sealing material, attachment mechanisms, and adhesive capable of maintaining an airtight seal between all exterior modular elements.

13. A rapid assembly lightweight modular structure according to claim 12, wherein said structure is airtight from four to twenty psia, comprising: modular elements that when assembled form a structure, said modular elements including a vacuum pump capable of removing all air from the interior of the structure; said modular elements further including an air pump capable of pressurizing the interior of the structure from four to twenty psia; said modular elements further including compressed air tanks; said modular elements further including life support equipment; said modular elements further including an airlock unit in the left half of the front wall, in place of the exterior door; said modular elements further including polymeric sealing material adhesively attached over the interior of all external modular elements except the airlock, the hangar doors, and the window; and said modular elements further including chemical, biological, radiological, and/or nuclear detection and decontamination equipment, such that the structure is capable of being used as a command post, detection and analysis laboratory, or shelter in an area subject to chemical, biological, radiological, or nuclear contamination.

14. A rapid assembly lightweight modular structure according to claim 12, comprising: modular elements that when assembled form a structure, said modular elements including thermal insulation installed on the exterior of the structure, and said structure further including heating and air conditioning equipment in the interior of the structure, such that the structure is capable of maintaining the interior temperature within a range of 15.55° C./60° F. to 26.66° C./80° F. in areas where the temperature outside the structure is extreme, including the artic, Antarctica, and desert areas, and wherein the structure is capable of being used for-the purposes of habitation, shelter, garaging vehicles, maintenance and repair of equipment, storage of supplies, growing plants, or scientific research.

15. A rapid assembly lightweight modular structure according to claim 12, wherein the structure is capable of being assembled by two robots.

16. A rapid assembly lightweight modular structure according to claim 11, wherein the structure is capable of being assembled by two robots.

* * * * *